US012605956B2

(12) United States Patent
Oishi et al.

(10) Patent No.: US 12,605,956 B2
(45) Date of Patent: Apr. 21, 2026

(54) IMAGE FORMATION APPARATUS AND METHOD FOR CONTROLLING IMAGE FORMATION APPARATUS

(71) Applicant: TOSHIBA TEC KABUSHIKI KAISHA, Tokyo (JP)

(72) Inventors: Sadatoshi Oishi, Shizuoka (JP); Masakazu Kato, Shizuoka (JP)

(73) Assignee: TOSHIBA TEC KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 18/972,048

(22) Filed: Dec. 6, 2024

(65) Prior Publication Data

US 2025/0236129 A1     Jul. 24, 2025

(30) Foreign Application Priority Data

Jan. 22, 2024     (JP) ................................. 2024-007368

(51) Int. Cl.
*B41J 35/36* (2006.01)
*G06K 15/00* (2006.01)
*H04L 9/32* (2006.01)

(52) U.S. Cl.
CPC ............ *B41J 35/36* (2013.01); *G06K 15/407* (2013.01); *H04L 9/3268* (2013.01)

(58) Field of Classification Search
CPC ...... B41J 35/36; G06K 15/407; H04L 9/3268; H04L 63/0823; H04L 9/3263
See application file for complete search history.

(56) References Cited

U.S. PATENT DOCUMENTS

| | | | |
|---|---|---|---|
| 7,664,257 B2 * | 2/2010 | Hohberger | ............... B41J 35/36 |
| | | | 713/168 |
| 2017/0230540 A1 | 8/2017 | Sasaki | |
| 2021/0036870 A1 * | 2/2021 | Da Conceicao | ...... H04L 9/3268 |
| 2021/0146694 A1 * | 5/2021 | Wagener | .............. H04L 9/0897 |
| 2023/0166933 A1 | 6/2023 | Hoshi | |

FOREIGN PATENT DOCUMENTS

| | | |
|---|---|---|
| JP | 2005-297223 A | 10/2005 |
| JP | 2015-162694 A | 9/2015 |

OTHER PUBLICATIONS

Extended European Search Report dated May 22, 2025 issued in EP Application No. 25152664.6, 11 pages.

* cited by examiner

*Primary Examiner* — Christle I Marshall
(74) *Attorney, Agent, or Firm* — FOLEY & LARDNER LLP

(57)     ABSTRACT

Provided is an image formation apparatus that prevents use of a consumable that is not a genuine product. An image formation apparatus includes one or more processors. The one or more processors read, from an IC tag of an ink ribbon, ID information and a digital certificate based on the ID information or information other than the ID information. The one or more processors verify the digital certificate based on the ID information.

6 Claims, 7 Drawing Sheets

IMAGE FORMATION APPARATUS AND METHOD FOR CONTROLLING IMAGE FORMATION APPARATUS

CROSS-REFERENCE TO RELATED APPLICATION

This application is based upon and claims the benefit of priority from Japanese Patent Application No. 2024-007368, filed on Jan. 22, 2024, the entire contents of which are incorporated herein by reference.

FIELD

Embodiments described herein relate to an image formation apparatus and a method for controlling an image formation apparatus.

BACKGROUND

An image formation apparatus that determines whether a supplied consumable is a genuine product is known.

DETAILED DESCRIPTION

In general, according to one embodiment, an image formation apparatus and a method for controlling an image formation apparatus that prevent use of a consumable that is not a genuine product are provided.

An image formation apparatus according to an embodiment includes a reading unit and a verification unit. The reading unit reads, from an IC tag of an ink ribbon, ID information (herein referred to also as unique ID information) and a digital certificate based on the unique ID information or information other than the unique ID information. The verification unit verifies the digital certificate based on the unique ID information.

Hereinafter, an embodiment will be described with reference to the drawings. In the description, components having substantially the same function and configuration are denoted by the reference same numerals. The following embodiment illustrates technical ideas. The embodiment does not specify a material, a shape, a structure, an arrangement, or the like of the components. The embodiment can be modified in various ways.

Configuration

Figure 1:
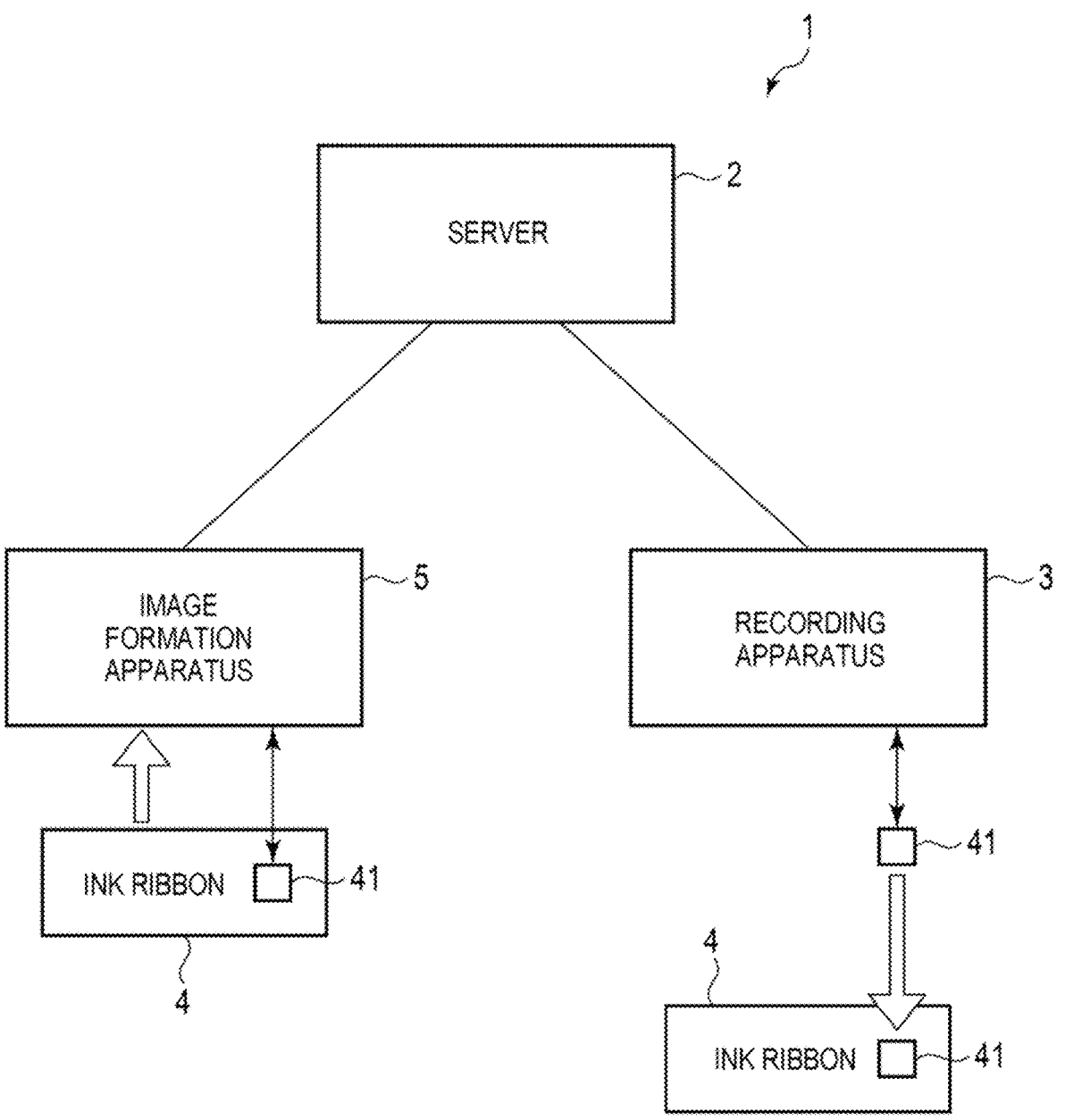
FIG. 1 is a block diagram illustrating a configuration example of a printing system according to an embodiment.

FIG. 1 is a block diagram illustrating a configuration example of a printing system according to an embodiment.

A printing system 1 is a system that checks whether an ink ribbon used during printing is a genuine product, and prohibits printing when the ink ribbon is not a genuine product or prompts the checking. The printing system 1 includes a server 2, a recording apparatus 3, an ink ribbon 4, and an image formation apparatus 5.

The ink ribbon 4 is a consumable used when the image formation apparatus 5 performs printing. The ink ribbon 4 includes an IC tag 41. The IC tag 41 is an element that can perform near distance wireless communication and that can store data in a non-volatile manner, such as an RFID tag. In addition, the IC tag 41 stores an ID (e.g., ID information), herein also referred to as an unique ID which is unique information for one individual. The unique ID is stored so as not to be rewritten.

The server 2 is connected to the recording apparatus 3 and the image formation apparatus 5. The server 2 transmits information to the recording apparatus 3 and the image formation apparatus 5. Specifically, for example, the server 2 transmits a secret key used for encryption to the recording apparatus 3. For example, the server 2 transmits, to the image formation apparatus 5, a public key used for decryption paired with the secret key transmitted to the recording apparatus 3.

The recording apparatus 3 stores data in the IC tag 41. The recording apparatus 3 is used in a process of manufacturing the ink ribbon 4. The ink ribbon 4 is formed by incorporating the IC tag 41 in which the data is stored by the recording apparatus 3. The data stored in the IC tag 41 by the recording apparatus 3 includes at least a digital certificate for certifying that the ink ribbon 4 is a genuine product. Details of the digital certificate will be described later.

The image formation apparatus 5 accommodates the ink ribbon 4 and performs printing based on the accommodated ink ribbon 4. The image formation apparatus 5 communicates with the IC tag 41 included in the accommodated ink ribbon 4 and verifies the digital certificate. Details of the verification will be described later. The image formation apparatus 5 performs printing when the digital certificate is correct, and does not perform printing when the digital certificate is not correct, or prompts checking.

Figure 2:
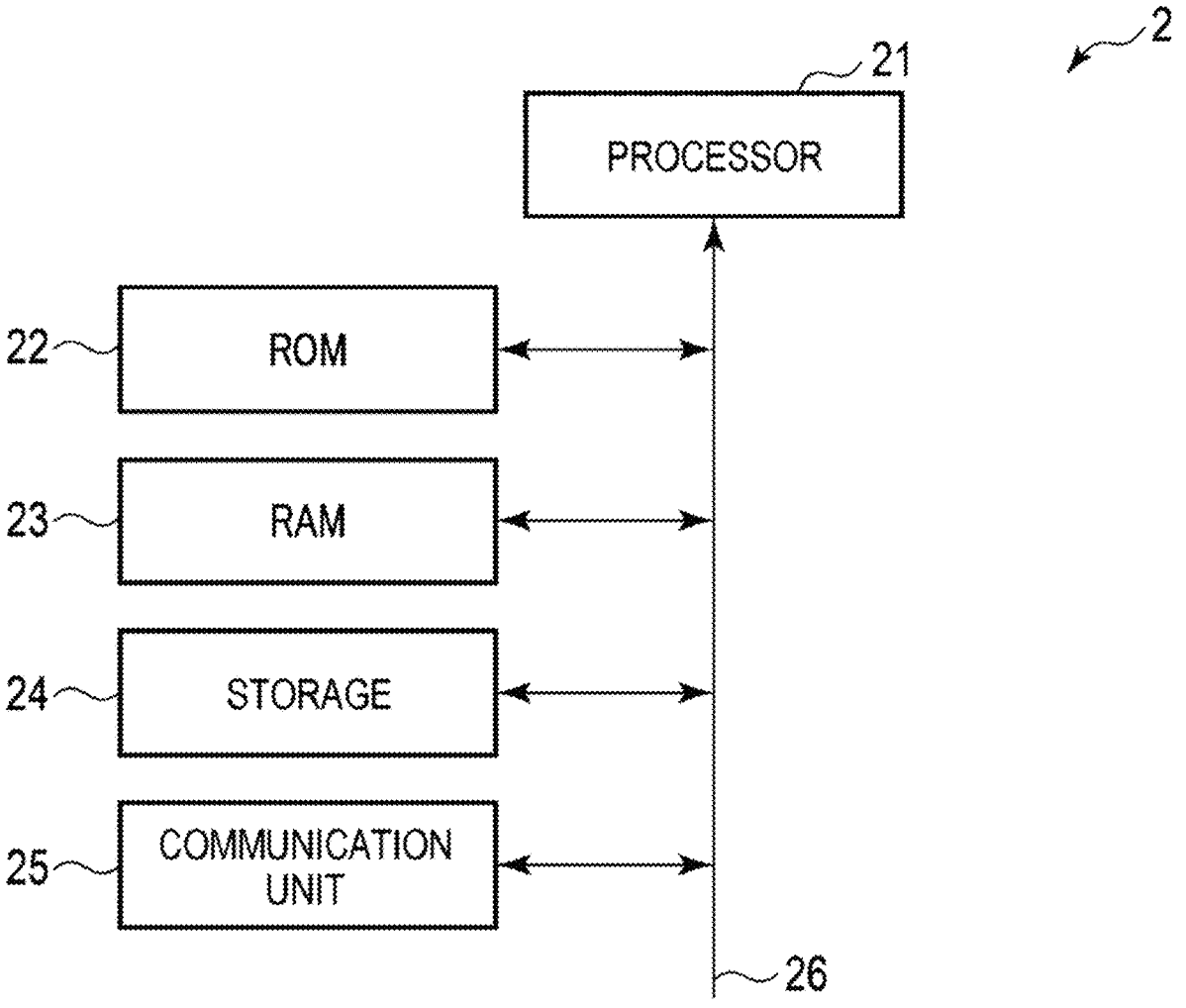
FIG. 2 is a block diagram illustrating a configuration example of a server.

FIG. 2 is a block diagram illustrating a configuration example of the server 2 according to the embodiment. The server 2 includes a processor 21, a read only memory (ROM) 22, a random access memory (RAM) 23, a storage 24, a communication unit 25, and a system bus 26. The system bus 26 includes an address bus, a data bus, a control signal line, and the like. The system bus 26 connects the processor 21, the ROM 22, the RAM 23, the storage 24, and the communication unit 25 to one another. A computer as the server 2 is formed by connecting the processor 21, the ROM 22, the RAM 23, and the storage 24 via the system bus 26.

The processor 21 corresponds to a central part of the above-described computer. The processor 21 controls units to implement various functions of the server 2 according to operating systems or application programs. The processor 21 is, for example, a central processing unit (CPU).

The ROM 22 is a non-volatile storage device. The ROM 22 stores preset operating systems or application programs, control data, and the like.

The RAM 23 is a volatile storage device. The RAM 23 is also used as a work area where data is rewritten by the processor 21. The RAM 23 is also used as a buffer memory for temporarily storing data.

The storage 24 corresponds to an auxiliary storage unit of the above-described computer. The storage 24 stores data to be used by the processor 21 when performing various processes, data generated by the processes performed by the processor 21, and the like. The storage 24 may also store the above-described application programs. The storage 24 is, for example, an electric erasable programmable read only memory (EEPROM) (registered trademark), a hard disk drive (HDD), or a solid state drive (SSD).

The communication unit 25 communicates with an outside of the server 2.

Figure 3:
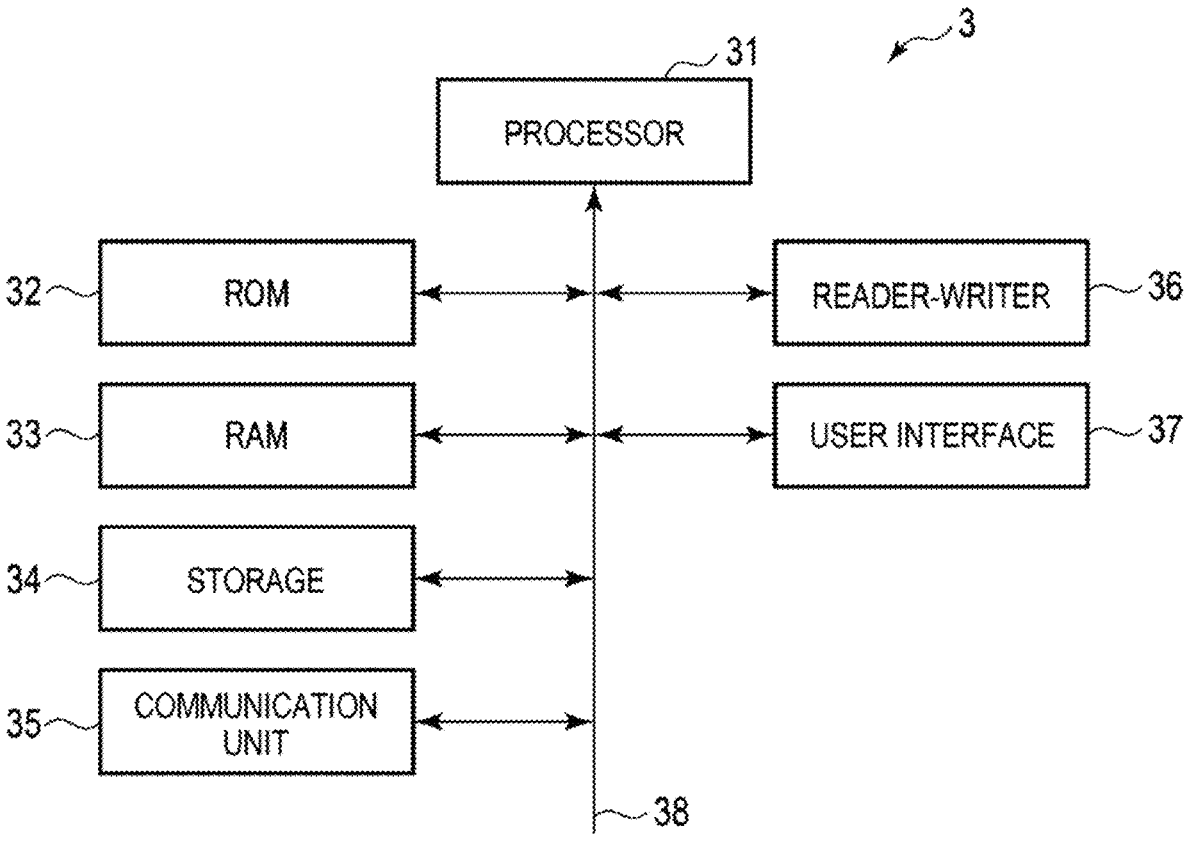
FIG. 3 is a block diagram illustrating a configuration example of a recording apparatus.

FIG. 3 is a block diagram illustrating a configuration example of the recording apparatus 3 according to the embodiment. The recording apparatus 3 includes a processor 31, a ROM 32, a RAM 33, a storage 34, a communication unit 35, a reader-writer 36, a user interface 37, and a system bus 38. The system bus 38 includes an address bus, a data bus, a control signal line, and the like. The system bus 38 connects the processor 31, the ROM 32, the RAM 33, the storage 34, the communication unit 35, the reader-writer 36, and the user interface 37 to one another. A computer as the recording apparatus 3 is formed by connecting the processor 31, the ROM 32, the RAM 33, and the storage 34 via the system bus 38.

The processor 31 corresponds to a central part of the above-described computer. The processor 31 controls units to implement various functions of the recording apparatus 3 according to operating systems or application programs. The processor 31 is, for example, a CPU.

The ROM 32 is a non-volatile storage device. The ROM 32 stores preset operating systems or application programs, control data, and the like.

The RAM 33 is a volatile storage device. The RAM 33 is also used as a work area where data is rewritten by the processor 31. The RAM 33 is also used as a buffer memory for temporarily storing data.

The storage 34 corresponds to an auxiliary storage unit of the above-described computer. The storage 34 stores data to be used by the processor 31 when performing various processes, data generated by the processes performed by the processor 31, and the like. The storage 34 may also store the above-described application programs. The storage 34 is, for example, an EEPROM (registered trademark), an HDD, or an SSD.

The communication unit 35 communicates with an external component of the recording apparatus 3.

The reader-writer 36 communicates with the IC tag 41 outside the recording apparatus 3. The reader-writer 36 can read data from the IC tag 41 and write data to the IC tag 41 (including deletion of data).

The user interface 37 is, for example, a touch panel. The user interface 37 notifies a user who operates the recording apparatus 3 of various types of information, and receives an input from the user.

Figure 4:
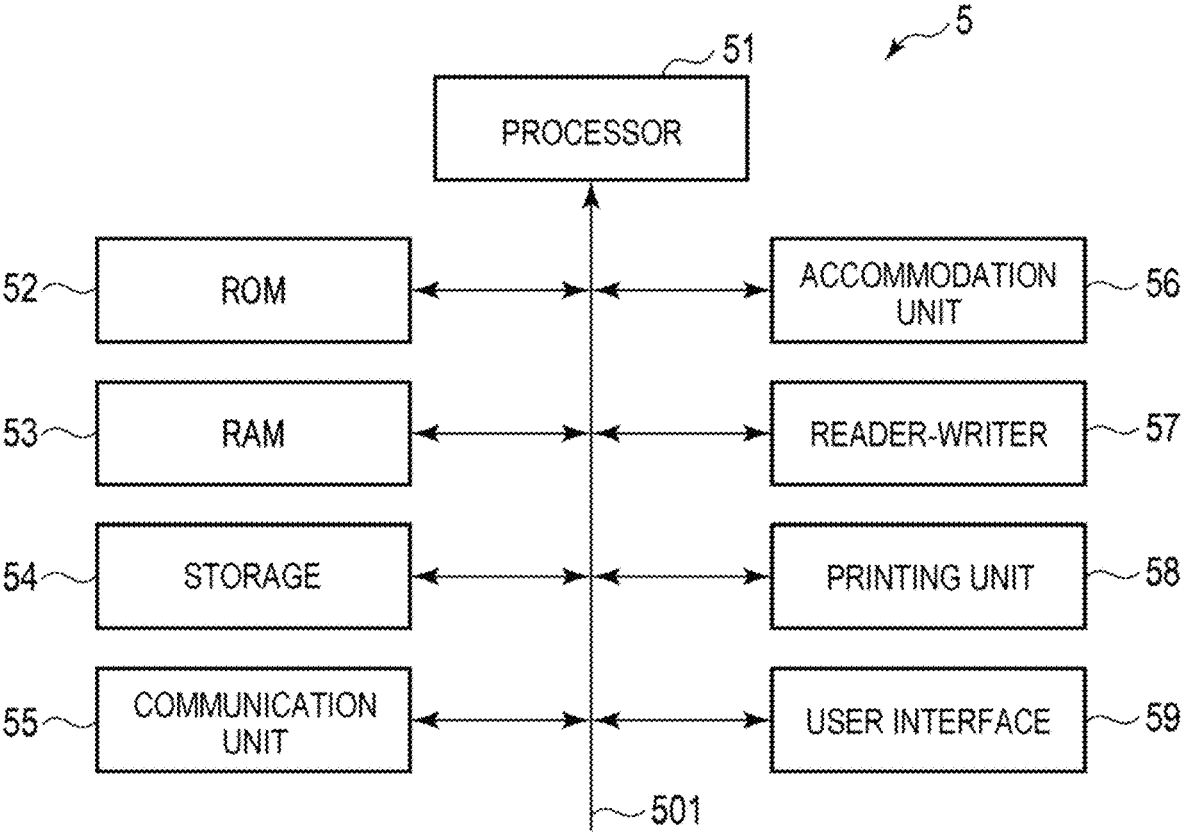
FIG. 4 is a block diagram illustrating a configuration example of an image formation apparatus.

FIG. 4 is a block diagram illustrating a configuration example of the image formation apparatus 5 according to the embodiment. The image formation apparatus 5 includes a processor 51, a ROM 52, a RAM 53, a storage 54, a communication unit 55, an accommodation unit 56, a reader-writer 57, a printing unit 58, a user interface 59, and a system bus 501. The system bus 501 includes an address bus, a data bus, a control signal line, and the like. The system bus 501 connects the processor 51, the ROM 52, the RAM 53, the storage 54, the communication unit 55, the accommodation unit 56, the reader-writer 57, the printing unit 58, and the user interface 59 to one another. A computer as the image formation apparatus 5 is formed by connecting the processor 51, the ROM 52, the RAM 53, and the storage 54 via the system bus 501.

The processor 51 corresponds to a central part of the above-described computer. The processor 51 controls units to implement various functions of the image formation apparatus 5 according to operating systems or application programs. The processor 51 is, for example, a CPU.

The ROM 52 is a non-volatile storage device. The ROM 52 stores preset operating systems or application programs, control data, and the like.

The RAM 53 is a volatile storage device. The RAM 53 is also used as a work area where data is rewritten by the processor 51. The RAM 53 is also used as a buffer memory for temporarily storing data.

The storage 54 corresponds to an auxiliary storage unit of the above-described computer. The storage 54 stores data to be used by the processor 51 when performing various processes, data generated by the processes performed by the processor 51, and the like. The storage 54 may also store the above-described application programs. The storage 54 is, for example, an EEPROM (registered trademark), an HDD, or an SSD.

The application program stored in the ROM 52 or the storage 54 includes a processing program described related to an information process to be executed by the image formation apparatus 5. A method for installing the processing program in the ROM 52 or the storage 54 is not particularly limited. The processing program can be installed in the ROM 52 or the storage 54 by being recorded in a removable recording medium or being distributed by communication via a network. The recording medium may be in any form as long as the program can be recorded and is readable by an apparatus, such as a CD-ROM or a memory card.

The communication unit 55 communicates with an outside of the image formation apparatus 5.

The accommodation unit 56 accommodates the ink ribbon 4. The accommodation unit 56 includes, for example, a sensor for detecting a remaining amount of the accommodated ink ribbon 4.

The reader-writer 57 communicates with the IC tag 41 included in the ink ribbon 4 accommodated in the accommodation unit 56. The reader-writer 57 can read data from the IC tag 41 and write data to the IC tag 41 (including deletion of data).

The printing unit 58 performs printing using the ink ribbon 4 accommodated in the accommodation unit 56.

The user interface 59 is, for example, a touch panel. The user interface 59 notifies a user who operates the image formation apparatus 5 of various types of information, and receives an input from the user.

Operations

Operations of the units of the printing system 1 will be described. In the printing system 1, encryption and decryption are performed using a secret key and a public key. A set including the secret key and the public key is generated in the server 2. The secret key is transmitted from the server 2 to the recording apparatus 3 and stored in the storage 34 of the recording apparatus 3. The public key is transmitted from the server 2 to the image formation apparatus 5 and stored in the storage 54 of the image formation apparatus 5. The following description is based on an assumption that the secret key is stored in the storage 34 of the recording apparatus 3 and the public key is stored in the storage 54 of the image formation apparatus 5 as described above.

Figure 5:
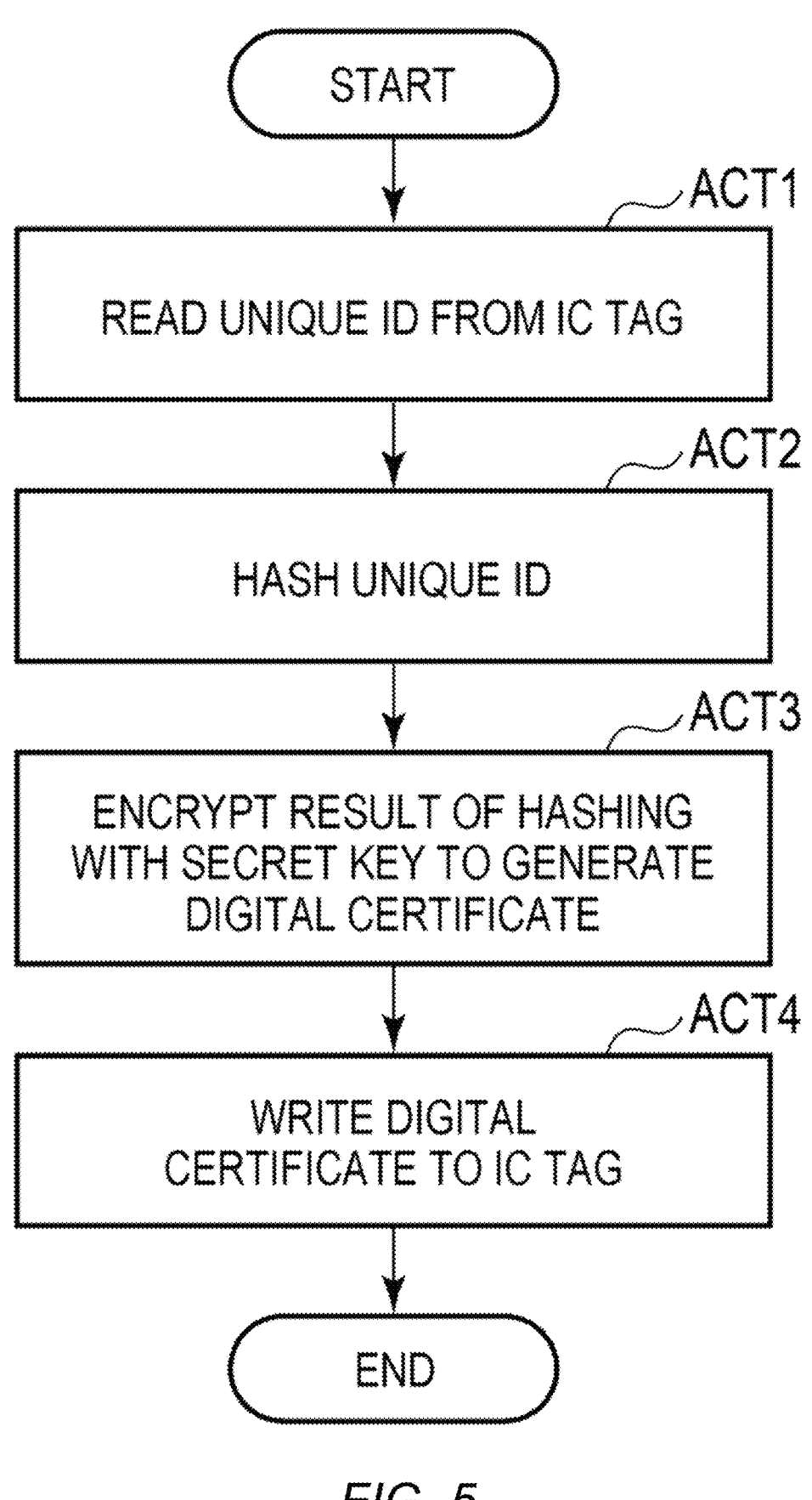
FIG. 5 is a flowchart illustrating an example of a recording process of the recording apparatus.

Operations of the recording apparatus 3 in the process of manufacturing the ink ribbon 4 will be described. FIG. 5 is a flowchart illustrating an example of a recording process of the recording apparatus 3 according to the embodiment. The recording process is a process of recording the digital certificate in the IC tag 41 incorporated in the ink ribbon 4.

When the recording process is started (start), the processor 31 of the recording apparatus 3 reads a unique ID (e.g., an ID) from the IC tag 41 (ACT 1). Specifically, the processor 31 controls the reader-writer 36 to read the unique ID from the IC tag 41.

The processor 31 hashes the unique ID (ACT 2). Specifically, the processor 31 hashes the unique ID using a certain hash function.

The processor 31 encrypts a result of the hashing with a secret key to generate a digital certificate (ACT 3). Specifically, the processor 31 encrypts the result of the hashing executed in ACT 2 using the secret key stored in the storage 34 to generate the digital certificate.

The processor 31 writes the digital certificate to the IC tag 41 (ACT 4). Specifically, the processor 31 controls the reader-writer 36 to write the digital certificate generated in ACT 3 to the IC tag 41. Then, a series of processes illustrated in FIG. 5 ends (end).

In this manner, the digital certificate based on the unique ID is written to the IC tag 41. Thereafter, the IC tag 41 to which the digital certificate is written is incorporated into the ink ribbon 4.

Figure 6:
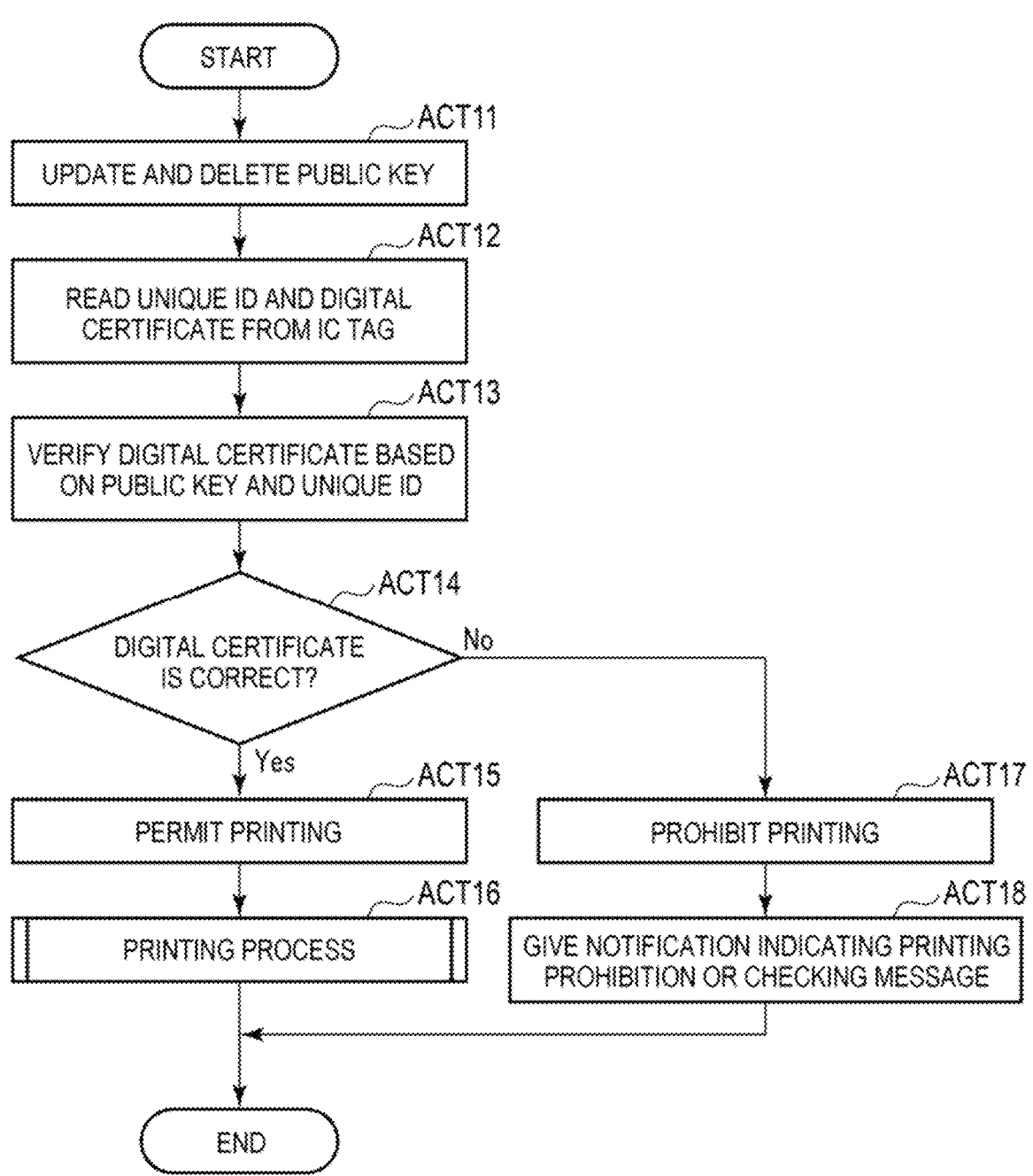
FIG. 6 is a flowchart illustrating an example of operations of the image formation apparatus.

Then, operations of the image formation apparatus 5 accommodating the ink ribbon 4 will be described. FIG. 6 is a flowchart illustrating an example of the operations of the image formation apparatus 5 according to the embodiment.

When power is turned on and the image formation apparatus 5 starts the operations (start), the processor 51 of the image formation apparatus 5 executes an update and a deletion of a public key (ACT 11). Specifically, the processor 51 communicates with the server 2 via the communication unit 55 and receives information related to the public key. When the public key stored in the storage 54 expires, the corresponding public key is deleted. When the server 2 discloses a new public key, the corresponding public key is newly stored in the storage 54. When the server 2 transmits a request of deleting a certain public key to the image formation apparatus 5, the processor 51 of the image formation apparatus 5 that receives the deletion request deletes the corresponding public key. In this manner, the update and the deletion of the public key are executed. The image formation apparatus 5 may simultaneously store a plurality of public keys.

The processor 51 reads the unique ID and the digital certificate from the IC tag 41 (ACT 12). Specifically, the processor 51 controls the reader-writer 57 to read the unique ID and the digital certificate from the IC tag 41 of the ink ribbon 4 accommodated in the accommodation unit 56.

The processor 51 verifies the digital certificate based on the public key and the unique ID (ACT 13). Specifically, the processor 51 decrypts the digital certificate read in ACT 12 using the public key stored in the storage 54. Further, the processor 51 hashes the unique ID read in ACT 12 using a hash function same as that in ACT 2 described with reference to FIG. 5. Then, the processor 51 checks whether a result of decrypting the digital certificate matches a result of hashing the unique ID. When the image formation apparatus 5 stores a plurality of public keys, the processor 51 decrypts the digital certificate using the plurality of public keys, and checks whether the result of decrypting the digital certificate matches the result of hashing the unique ID. If there is only one matching result, the image formation apparatus 5 verifies that the result of decrypting the digital certificate matches the result of hashing the unique ID. When no public key is stored in the image formation apparatus 5, the image formation apparatus 5 verifies that the result of decrypting the digital certificate does not match the result of hashing the unique ID.

The processor 51 determines whether the digital certificate is correct (ACT 14). Specifically, when the result of decrypting the digital certificate matches the result of hashing the unique ID, the processor 51 determines that the digital certificate is correct (ACT 14, Yes) and permits printing (ACT 15). Specifically, the processor 51 permits operations of the printing unit 58. When the printing is permitted, the processor 51 executes a printing process (ACT 16). Details of the printing process will be described later.

On the other hand, when the result of decrypting the digital certificate does not match the result of hashing the unique ID, the processor 51 determines that the digital certificate is not correct (ACT 14, No) and prohibits the printing (ACT 17). For example, the processor 51 determines that ink ribbon is not a genuine product. Specifically, the processor 51 prohibits the operations of the printing unit 58. When the printing is prohibited, the processor 51 notifies a user of a printing prohibition or a checking message (ACT 18). Specifically, the processor 51 controls the user interface 59 to notify the user that the printing is prohibited, or to notify the user of a message for prompting checking.

When the process in ACT 16 or the process in ACT 18 is completed, a series of processes illustrated in FIG. 6 ends (end).

Figure 7:
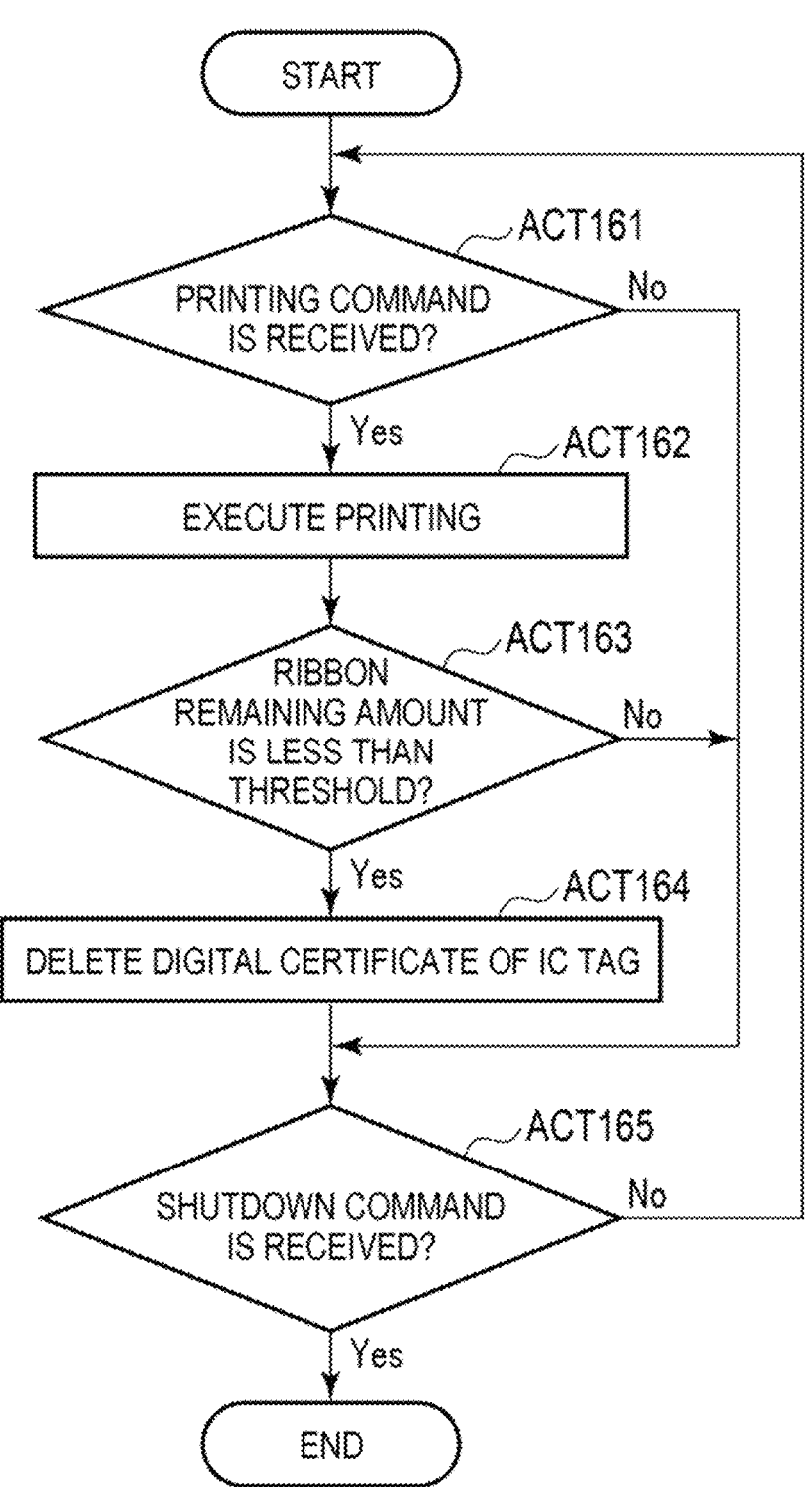
FIG. 7 is a flowchart illustrating an example of a printing process.

The printing process of the image formation apparatus 5 will be described in detail. FIG. 7 is a flowchart illustrating an example of the printing process of the image formation apparatus 5 according to the embodiment. When the printing process is started (start), the processor 51 of the image formation apparatus 5 determines whether a printing command is received (ACT 161). Specifically, the processor 51 determines whether the printing command is received via, for example, the communication unit 55 or the user interface 59. When the printing command is received (ACT 161, Yes), the processor 51 executes printing (ACT 162). Specifically, the processor 51 controls the printing unit 58 to execute the printing.

When the execution of the printing is completed, the processor 51 determines whether the remaining amount in the ribbon is less than a threshold (ACT 163). Specifically, the processor 51 grasps the ribbon remaining amount of the ink ribbon 4 using, for example, the sensor provided in the accommodation unit 56, and determines whether the remaining amount is less than the threshold. When the remaining amount is less than the threshold (ACT 163, Yes), the processor 51 deletes the digital certificate of the IC tag 41 (ACT 164). Specifically, the processor 51 controls the reader-writer 57 to delete the digital certificate stored in the IC tag 41.

When the deletion of the digital certificate is completed, when the printing command is not received in ACT 161 (ACT 161, No), or when the ribbon remaining amount is not less than the threshold in ACT 163 (ACT 163, No), the processor 51 determines whether a shutdown command is received (ACT 165). Specifically, the processor 51 determines whether the shutdown command is received via, for example, the communication unit 55 or the user interface 59. When the shutdown command is not received (ACT 165, No), the process in ACT 161 is executed. When the shutdown command is received (ACT 165, Yes), a series of processes illustrated in FIG. 7 ends.

Effects

According to the embodiment as described above, the recording apparatus 3 stores a unique ID and a digital certificate based on the unique ID in the ink ribbon 4 as a genuine product in the printing system 1. Then, in the printing system 1, the image formation apparatus 5 verifies whether a digital certificate of the ink ribbon 4 is based on the unique ID. Accordingly, the image formation apparatus 5 can determine whether the ink ribbon 4 accommodated in the accommodation unit 56 is a genuine product.

Specifically, the digital certificate stored in the ink ribbon 4 as a genuine product is information obtained by encrypting information generated based on the unique ID unique to one IC tag 41 with the secret key. The digital certificate indicates the ink ribbon 4 as the genuine product. Therefore, a manufacturer of a non-genuine product having no secret key cannot generate a correct digital certificate. In addition, when the digital certificate is copied from the IC tag 41 of the ink ribbon 4 as a genuine product and copied to the IC tag 41 of the ink ribbon 4 as a non-genuine product, the digital certificate is also not correct since the unique ID of the IC tag 41 is different. Therefore, the image formation apparatus 5 according to the embodiment can achieve high security as compared with a case where certain information is encrypted and used as information indicating a genuine product.

According to the embodiment, the image formation apparatus 5 deletes the digital certificate from the IC tag 41 when the remaining amount of the ink ribbon 4 is less than the threshold. Accordingly, the set including the unique ID and the digital certificate can be prevented from remaining stored in the IC tag 41 of the used ink ribbon 4. When the set including the unique ID and the digital certificate remains stored in the IC tag 41 of the used ink ribbon 4, there is a possibility that the IC tag 41 is removed and is used as a non-genuine product, but the image formation apparatus 5 according to the embodiment can reduce this possibility.

According to the embodiment, the image formation apparatus 5 updates and deletes the public key based on the information received from the server 2. Accordingly, for example, when confidentiality of the secret key is lost, the image formation apparatus 5 according to the embodiment can delete the corresponding public key at an appropriate timing and update the public key to a new public key.

Other Modifications

In the above-described embodiment, the case where the result of hashing the unique ID is encrypted with the secret key to generate the digital certificate is described as an example. The digital certificate may be generated by hashing information including the unique ID and encrypting the hashed information with the secret key, and is not limited to the case of hashing only the unique ID. For example, information obtained by combining the unique ID and ink ribbon information such as a color and a length may be hashed, and the result of the hashing may be encrypted with the secret key to generate the digital certificate. In this specification, the information including the unique ID is referred to as "unique ID information". The unique ID information may also be referred to as ID information. That is, the digital certificate may be generated by hashing the unique ID information and encrypting the result of the hashing with the secret key. Information other than the unique ID included in the unique ID information used to generate the digital certificate is stored in the IC tag 41 together with the generated digital certificate so as to be readable during the verification of the digital certificate.

In the above-described embodiment, the case where the image formation apparatus 5 performs the printing based on the ink ribbon 4 including the IC tag 41 is described as an example. For example, the image formation apparatus 5 may perform printing based on a consumable including the IC tag 41, and may perform printing based on an ink cartridge including the IC tag 41 or a toner cartridge including the IC tag 41.

In the above-described embodiment, the case where the accommodation unit 56 of the image formation apparatus 5 includes the sensor for detecting the ribbon remaining amount is described as an example. A method for detecting the ribbon remaining amount in the image formation apparatus 5 is not limited to using the sensor. For example, the image formation apparatus 5 may detect the ribbon remaining amount by storing a usage amount of the ink ribbon in the storage 54 every time the printing is executed, calculating a total usage amount based on the stored usage amount, and comparing the total usage amount of the ink ribbon with an initial amount of the ink ribbon.

Some or all of the embodiment and the modification may be described as in the following Appendices, but are not limited thereto.

Appendix 1

An image formation apparatus including one or more processors to:
  read, from an IC tag of an ink ribbon, unique ID information and a digital certificate based on the unique ID information or information other than the unique ID information; and
  verify the digital certificate based on the unique ID information.

Appendix 2

The image formation apparatus according to Appendix 1, in which the digital certificate comprises encrypted information obtained by encrypting hashed unique ID information subjected to hashing.

Appendix 3

The image formation apparatus according to Appendix 2, in which the one or more processors compare the hashed unique ID information extracted from the digital certificate with a value obtained by hashing the unique ID information.

Appendix 4

The image formation apparatus according to Appendix 1 the one or more processors further to: delete the digital certificate from the IC tag when a ribbon remaining amount of the ink ribbon is less than a threshold.

Appendix 5

The image formation apparatus according to Appendix 2, in which the digital certificate is generated by encrypting the hashed unique ID information with a secret key, and the digital certificate is decrypted and verified using a public key paired with the secret key.

Appendix 6

The image formation apparatus according to Appendix 5 the one or more processors further to: communicate with an outside and update or invalidate the public key based on information received from the outside.

Appendix 7

The image formation apparatus according to Appendix 5, the one or more processors further to: invalidate the public key when the public key is expired.

Appendix 8

A method for controlling an image formation apparatus including:

reading, by one or more processors, from an IC tag of an ink ribbon, unique ID information and a digital certificate based on the unique ID information or information other than the unique ID information; and verifying, by the one or more processors, the digital certificate based on the unique ID information.

While certain embodiments have been described, the embodiments have been presented by way of example only and are not intended to limit the scope of the disclosure. These novel embodiments can be implemented in various other forms, and various omissions, substitutions, and modifications can be made without departing from the gist of the disclosure. The embodiments and the modifications thereof are included in the scope and the gist of the disclosure, and are included in the scope of the disclosure disclosed in the claims and equivalents thereof.

What is claimed is:

1. An image formation apparatus comprising one or more processors to:

read, from an IC tag of an ink ribbon, ID information and a digital certificate based on the ID information or information other than the ID information; and verify the digital certificate based on the ID information, wherein the digital certificate comprises encrypted information obtained by encrypting hashed ID information subjected to hashing.

2. The image formation apparatus according to claim 1, the one or more processors:

compare the hashed ID information extracted from the digital certificate with a value obtained by hashing the ID information.

3. The image formation apparatus according to claim 1, the one or more processors:

delete the digital certificate from the IC tag when a ribbon remaining amount of the ink ribbon is less than a threshold.

4. A method for controlling an image formation apparatus, comprising:

reading, by one or more processors, from an IC tag of an ink ribbon, ID information and a digital certificate based on at least the ID information or information other than the ID information; and verifying, by the one or more processors, the digital certificate based on the ID information, wherein the digital certificate comprises encrypted information obtained by encrypting hashed ID information subjected to hashing.

5. The method according to claim 4, further comprising:

comparing, by the one or more processors, the hashed ID information extracted from the digital certificate with a value obtained by hashing the ID information.

6. The method according to claim 4, further comprising:

deleting, by the one or more processors, the digital certificate from the IC tag when a ribbon remaining amount of the ink ribbon is less than a threshold.

* * * * *